(12) United States Patent
Solberg

(10) Patent No.: US 9,976,058 B2
(45) Date of Patent: May 22, 2018

(54) HIGH TEMPERATURE SEAL COMPOSITIONS AND METHODS OF USING SAME

(71) Applicant: Palo Alto Research Center Incorporated, Palo Alto, CA (US)

(72) Inventor: Scott Eugene Solberg, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days. days.

(21) Appl. No.: 14/725,780

(22) Filed: May 29, 2015

(65) Prior Publication Data

US 2016/0347972 A1    Dec. 1, 2016

(51) Int. Cl.
| C03C 3/087 | (2006.01) |
| B65B 51/02 | (2006.01) |
| C09J 1/00 | (2006.01) |
| C03C 8/24 | (2006.01) |
| C04B 37/00 | (2006.01) |
| C09K 3/10 | (2006.01) |
| B65D 53/06 | (2006.01) |

(52) U.S. Cl.
CPC ............. *C09J 1/00* (2013.01); *B65B 51/02* (2013.01); *B65D 53/06* (2013.01); *C03C 8/24* (2013.01); *C04B 37/00* (2013.01); *C09K 3/1003* (2013.01)

(58) Field of Classification Search
None
See application file for complete search history.

(56) References Cited

U.S. PATENT DOCUMENTS

| 3,281,308 A | | 10/1966 | D'Asto | |
| 3,367,696 A | * | 2/1968 | Langley | C04B 37/005 228/124.6 |
| 3,441,421 A | | 4/1969 | Sarver et al. | |
| 3,459,569 A | * | 8/1969 | Ellis | C03C 8/24 501/63 |
| 3,468,752 A | | 9/1969 | Yamamoto et al. | |
| 4,015,048 A | | 3/1977 | Martin | |
| 4,105,826 A | * | 8/1978 | Thomas | C03C 3/087 313/623 |
| 4,309,507 A | * | 1/1982 | Davis | C03C 3/091 174/50.61 |
| 4,315,991 A | * | 2/1982 | Hagy | C03C 10/0045 501/26 |
| 4,496,475 A | * | 1/1985 | Abrams | H01B 1/16 106/1.14 |
| 4,671,928 A | * | 6/1987 | Herron | B22F 1/0059 156/89.17 |
| 4,814,298 A | * | 3/1989 | Nelson | C03C 8/02 501/17 |
| 6,124,224 A | * | 9/2000 | Sridharan | C03C 8/24 204/424 |
| 6,271,158 B1 | * | 8/2001 | Xue | C03C 8/14 429/174 |
| 6,518,212 B1 | | 2/2003 | Wagh et al. | |
| 6,878,651 B2 | * | 4/2005 | Crosbie | C03C 3/078 501/15 |
| 8,163,436 B2 | * | 4/2012 | Larsen | C03C 8/24 429/469 |
| 8,664,134 B2 | | 3/2014 | Goedeke et al. | |
| 2006/0063659 A1 | | 3/2006 | Xue et al. | |
| 2007/0238599 A1 | | 10/2007 | Pinckney et al. | |
| 2009/0239122 A1 | | 9/2009 | Brow et al. | |
| 2009/0253017 A1 | | 10/2009 | Larsen et al. | |
| 2015/0360994 A1 | * | 12/2015 | Maeda | C03C 8/04 501/70 |

FOREIGN PATENT DOCUMENTS

GB    579515 A    8/1946

OTHER PUBLICATIONS

International Search Report for counterpart EP Application No. 16169669.5, dated Sep. 30, 2016.

* cited by examiner

*Primary Examiner* — Melvin C Mayes
*Assistant Examiner* — Colette Nguyen
(74) *Attorney, Agent, or Firm* — Palo Alto Research Center Incorporated

(57) ABSTRACT

The disclosure relates to sealant compositions for forming hermetic seals, methods of use, and hermetically sealed products. The sealant compositions comprise a first inorganic oxide chosen from at least one of $MgSiO_3$, $MgO$, $MgTiO_3$, $CaO$, and $CaSiO_3$, a second inorganic oxide chosen from $SiO_2$, at least one solvent, and optionally at least one organic resin binder.

17 Claims, No Drawings

HIGH TEMPERATURE SEAL COMPOSITIONS AND METHODS OF USING SAME

This invention was made with government support under DE-FE0013062 awarded by Department of Energy (DOE). The government has certain rights in the invention.

FIELD OF THE DISCLOSURE

The disclosure relates to compositions capable of forming and/or maintaining a hermetic seal at high temperatures, and methods for forming a hermetic seal.

BACKGROUND

Certain applications require high-temperature, hermetic sealing of ceramic parts, e.g., a ceramic container with a cover, and/or seals that are capable of withstanding exposure to high temperatures. One design challenge that has been encountered with sealants for such applications relates to the ability to form and/or maintain a hermetic seal at extreme temperatures. For example, certain materials that are a potential match for a specific container material in terms of physical properties (e.g., coefficient of thermal expansion), and which might form a satisfactory adhesive bond, may not form a satisfactory hermetic seal during a high temperature application.

In addition, operating conditions may require exposure to oxidizing conditions (e.g., air), which eliminates the use of most metals, leaving only expensive noble metal options such as gold, silver, palladium, and platinum.

In addition, certain applications require sealing a container in a vacuum or in atmospheric pressure. However, operating conditions may change over time, where it would be desirable for the sealant to maintain a hermetic seal over a wide range of pressures.

It would thus be advantageous to provide compositions for forming a hermetic seal, and methods by which two parts may be sealed to one another that is capable of withstanding high temperatures, oxidizing environments, and/or over a range of pressure.

SUMMARY

The disclosure relates, in various embodiments, to a sealant composition comprising: a first inorganic oxide chosen from at least one of $MgSiO_3$, MgO, $MgTiO_3$, CaO, and $CaSiO_3$; a second inorganic oxide chosen from $SiO_2$; at least one solvent; and optionally at least one organic resin binder; wherein the $SiO_2$ is present in an amount of at least about 50 mole %, relative to the total amount of inorganic oxide; and wherein the coefficient of thermal expansion of the sealant composition is less than or equal to about $8 \times 10^{-6}/°C$.

The disclosure also relates to method for forming a hermetic seal comprising: applying a sealant composition to at least one of a first component and a second component at an area where the first component and second component are to be joined; adjoining the first component and second component; and applying heat to the first component, second component, and sealant composition to increase the surrounding air temperature to at least about 1000° C.; wherein the sealant composition comprises: a first inorganic oxide chosen from at least one of $MgSiO_3$, MgO, $MgTiO_3$, CaO, and $CaSiO_3$; a second inorganic oxide chosen from $SiO_2$; at least one solvent; optionally at least one organic resin binder; wherein the $SiO_2$ is present in an amount of at least about 50 mole %, relative to the total amount of inorganic oxide.

The disclosure also relates to hermetically sealed containers comprising: a body comprising at least one opening; a cover sized to close the at least one opening; a hermetic seal formed between the body and cover, wherein the hermetic seal is formed from a sealant composition comprising: a first inorganic oxide chosen from at least one of $MgSiO_3$, MgO, $MgTiO_3$, CaO, and $CaSiO_3$; a second inorganic oxide chosen from $SiO_2$; at least one solvent; optionally at least one organic resin binder; wherein the second inorganic oxide is present in an amount of at least about 50 mole %, relative to the total amount of inorganic oxide; and wherein the coefficient of thermal expansion of the sealant composition is less than or equal to about $8 \times 10^{-6}/°C$.

Additional features and advantages of the disclosure will be set forth in the detailed description which follows, and in part will be readily apparent to those skilled in the art from that description.

It is to be understood that both the foregoing general description and the following detailed description present various embodiments of the disclosure, and are intended to provide an overview or framework for understanding the nature and character of the disclosure, and are not intended to be limiting of the claims.

DETAILED DESCRIPTION

According to various embodiments, compositions for forming hermetic seals, e.g. for sealing two or more parts or components together, such as a container and cover, as well as methods for forming hermetic seals between two or more parts or components, are disclosed. In various embodiments, the sealant compositions may be capable of forming hermetic seals at high temperatures. In further embodiments, the sealant compositions may be capable of maintaining hermetic seals when subjected to high temperatures, for example over extended periods of time.

As used herein, the terms "seal," "sealing composition", "sealant", and "sealant composition" are intended to denote a composition capable of blocking the passage of gases or liquids.

As used herein, the term "hermetic" with regard to the term "seal," and variations thereof such as "hermetically sealed" or "hermetically sealing," are intended to denote a seal that is substantially airtight. By "substantially airtight," it is intended that the leak rate of air or other gases into or from the enclosure is less than or equal to about $1.0 \times 10^{-6}$ kPa*cc/s, less than or equal to about $1.0 \times 10^{-6}$ kPa*cc/s, or less than or equal to about $1.0 \times 10^{-7}$ kPa*cc/s.

As used herein, "high" temperatures are meant to encompass temperatures greater than about 1000° C., such as greater than about 1100° C., greater than about 1200° C., greater than about 1300° C., greater than about 1400° C., greater than about 1500° C., greater than about 1600° C., greater than about 1700° C.

The use of the terms "container" and "cover" herein are for ease of reference only, and are not intended to be limiting to a particular configuration, shape, function, etc. As used herein, the term "container" is intended to include any article that can be used to hold, store, or transport an item and is not limited to a specific shape (e.g., box, cylinder, etc.) or dimensions. As used herein, the term "cover" is intended to include any component that closes an opening in the container. For example, the cover can include a cap, sleeve, etc., that is dimensioned to mate with a corresponding portion of the container.

As used herein, the terms "component" or "part" are intended to denote one or more articles that may be sealed by the compositions and methods described. A component or part may, in various embodiments, comprise a refractory ceramic material. In various embodiments, one or more components or parts may comprise single-crystal or polycrystalline aluminum oxides. According to one embodiment, one or more components or parts may comprise $Al_2O_3$. In further embodiments, at least one component or part may comprise a metallic element, such as platinum. In certain embodiments, two or more components or parts may comprise the same material, and in other embodiments, two or more components or parts may comprise different materials.

As used herein "vacuum pressure" or "under vacuum" refers to a pressure of less than or equal to about 10 kPa, less than about 5 kPa, less than about 4 kPa, less than about 3 kPa, less than about 2 kPa, less than about 1 kPa. As used herein, "atmospheric pressure" means standard room pressure when no effort is made to increase or reduce the pressure, and is intended to include atmospheric pressure at any altitude.

According to various embodiments of the disclosure, seals formed from the compositions described herein may be formed and/or maintain a hermetic seal at a high temperature. For example, the seal may be formed and/or maintain a hermetic seal at a temperature greater than or equal to about 1200° C. The seal may be formed and/or maintain a hermetic seal at a temperature greater than or equal to about 1300° C. The seal may be formed and/or maintain a hermetic seal at a temperature greater than or equal to about 1400° C. The seal may be formed and/or maintain a hermetic seal at temperatures ranging from about 1100° C. to about 1700° C. The seal may be formed and/or maintain a hermetic seal at temperatures ranging from about 1200° C. to about 1600° C.

According to further embodiments, the sealant composition may be capable of maintaining a hermetic seal in high temperature conditions, including, in some embodiments, over extended periods of time. For example, the hermetic seal may be maintained at a temperature greater than or equal to about 1250° C., for any period of time, such as for a period greater than or equal to about 1000 hours.

Sealant Compositions

According to various embodiments, the sealant compositions comprise at least one first inorganic oxide and at least one second inorganic oxide, and may optionally further comprise at least one solvent, at least one organic resin binder, and/or at least one additional inorganic oxide.

The sealant composition can comprise at least one first inorganic oxide chosen from at least one of $MgSiO_3$, $MgO$, $MgTiO_3$, $CaO$, and $CaSiO_3$, and combinations thereof. The sealant composition can further comprise a second inorganic oxide chosen from $SiO_2$. In at least certain exemplary embodiments, the sealant composition can optionally further include one or more additional inorganic oxides. Exemplary additional inorganic oxides include, but are not limited to $BaO$, $SrO$, $TiO_2$, $ZrO_2$, $ZnO$, $Al_2O_3$, rare earth oxides, and combinations thereof. The total amount of inorganic oxide is the amount of first, second, and any additional inorganic oxides.

In various embodiments of the disclosure, the first inorganic oxide can be included in an amount ranging up to about 60%, such as up to about 50%, up to about 40%, up to about 30%, up to about 20%, or up to about 10%, given as mole percentage relative to the total amount of inorganic oxide. In further embodiments, the first inorganic oxide can be included in amounts of at least about 10%, such as at least about 20%, at least about 30%, at least about 40%, or at least about 50%, given as mole percentage relative to the total amount of inorganic oxide.

The second inorganic oxide can be included in amounts of at least about 40%, such as at least about 50%, at least about 60%, at least about 65%, at least about 70%, at least about 75%, at least about 80%, at least about 85%, or at least about 90%, given as mole percentage relative to the total amount of inorganic oxide. The second inorganic oxide can be included in an amount ranging from about 50 mole % to about 90 mole %, such as ranging from about 75% to about 85%, given as mole percentage relative to the total amount of inorganic oxide.

The optional additional inorganic oxides can be present in an amount less than about 20%, such as less than about 15%, less than about 10%, less than about 8%, less than about 5%, less than about 3%, or less than about 1%, such as less than about 0.5%, given as mole percentage relative to the total amount of inorganic oxide.

The sealant composition can optionally further include at least one solvent. The solvent can be chosen from water or any suitable organic solvent, including, but not limited to, ethanol, kerosene, mineral spirits, terpineol, esters of phthalic acid, such as dibutyl phthalate, butyl carbitol acetate, diethylene glycol ethers, diethylene glycol butyl ether, aliphatic di-esters, such as the ethyl and butyl esters of adipic and sebacic acids and high-boiling alcohols and alcohol esters, as well as mixtures thereof.

The solvent can, according to various embodiments, be included in an amount greater than or equal to about 30%, greater than or equal to about 40%, greater than or equal to about 50%, greater than or equal to about 60%, greater than or equal to about 70%, greater than or equal to about 80%, greater than or equal to about 90%, by volume, relative to the total volume of the sealant composition prior to firing.

The sealant composition can optionally further include at least one organic resin binder. Suitable organic resin binders can include any resin compatible with the solvent, including, but not limited to, cellulose derivatives such as ethyl cellulose, polyurethanes, acrylics, terpenes, styrenes, and the like.

The organic resin binder can, according to various embodiments, be present in amounts ranging from 0% to about 20%, by volume, relative to the total volume of the sealant composition prior to firing.

The sealant compositions can have a coefficient of thermal expansion that is less than or equal to about $8 \times 10^{-6}/°$ C. The coefficient of thermal expansion of the sealant composition is measured after firing the sealant composition (e.g., the sealant composition is heated to a sufficient temperature for a sufficient time to cause sintering of the inorganic oxides). For example, the coefficient of thermal expansion of the cured sealant compositions can be less than or equal to about $6 \times 10^{-6}/°$ C. The coefficient of thermal expansion of the cured sealant compositions can be less than or equal to about $2 \times 10^{-6}/°$ C.

According to one embodiment, the coefficient of thermal expansion of the sealant composition may be equal or substantially equal to the coefficient of thermal expansion of one or more of the components to which it is applied, e.g., one or both of a container and/or cover. For example, the ratio of the coefficient of thermal expansion of the sealant composition to the coefficient of thermal expansion of the container and/or cover can range from about 0.80:1 to about 1.2:1, from about 0.90:1 to about 1.1:1, from about 0.95:1 to about 1.05:1, such as about 0.97:1 to about 1.03:1.

Methods

According to various embodiments, the disclosure relates to methods of hermetically sealing two or more components, such as hermetically sealing ceramic containers. In at least certain embodiments, the methods provide seals that are hermetic when sealant compositions according to the disclosure are applied to ceramic parts at high temperatures, and/or provide seals that remain hermetic when subjected to high temperatures. According to various embodiments, the sealant compositions may be applied to one or more components, e.g. a container and/or cover, and then cured to form a hermetic seal therebetween.

The sealant compositions could also be applied to one or more plugs or patches and applied to a hole or opening on a component, e.g. a container, to form a hermetic seal between the plug or patch and the component.

In addition, the sealant compositions could be applied around a metallic component, such as a metallic wire (e.g. platinum wire) extending outward from an interior of a container to form a hermetic seal between the metallic wire and the container.

Applying the sealant composition to the components may be done by any method known, such as application by spatula, printed with a screen or stencil printer, or extruded through a nozzle. The components intended to be sealed together can optionally be held together for some period of time by any suitable method, e.g. by a user holding the components together, by clamps, or by another device suitable for maintaining a pressure between the components. Alternatively, the components may not be held together by any active means (e.g. the components may simply be held together by friction or by gravity).

According to one exemplary and non-limiting embodiment, a method may comprise sealing a container and cover. In the exemplary embodiment, the sealant composition may be applied to a surface of the container that is designed to mate with a corresponding surface of the cover, and the cover may be applied to the container. In another exemplary and non-limiting embodiment of sealing a container and cover, the sealant may be applied to the cover and subsequently the cover and container may subsequently be joined. In a further exemplary and non-limiting embodiment of sealing a container and cover, the sealant may be applied to both the container and the cover at the respective surfaces where the cover and container are to be joined together, and the cover and container may be subsequently joined together. In yet further exemplary and non-limiting embodiments of sealing a container and cover, the container and the cover may be joined together either with or without sealant composition being applied before the parts are joined, and then subsequently the sealant composition may be applied to the exterior surface in the area where the parts are joined. Although the exemplary methods are disclosed relative to sealing a cover and container, these examples are illustrative, and one of skill in the art will appreciate that such exemplary methods may also be used for sealing or forming a seal on or between other components.

The components to be sealed and sealant can be held in contact and heated in order to cure the composition and form a hermetic seal. For example, the components can be physically joined and the sealant composition applied, or vice versa, and any solvent dried leaving a green body comprising the inorganic oxides and organic resin. The dried and optionally cured and/or crosslinked sealant composition and components may then be subjected to sintering in a heating device such as a furnace. The temperature of the heating device can be chosen from any temperature suitable to sinter the organic oxides of the sealant composition.

The sealing methods may optionally, according to various exemplary embodiments, be performed under high temperature (e.g., temperatures in excess of 1000° C.), as described herein.

By way of example, during the sealing process, the components and sealant composition may be subjected to a temperature ranging from temperatures greater than or equal to about 1100° C., such as greater than or equal to about 1200° C., or greater than or equal to about 1300° C. The components and sealant composition may be subjected to temperatures ranging from about 1100° C. to about 1700° C., such as ranging from about 1200° C. to about 1600° C. The elevated temperature may be accomplished by any known method, such as, for example, placing the components and sealant composition into a furnace.

In various exemplary embodiments, the sealing methods may take place at atmospheric pressure, or may optionally take place in an environment having reduced pressure. For example, subsequent to contacting the sealant to the parts, e.g. container and/or cover, the parts with the sealant composition may be subjected to vacuum pressure before, during, or after the parts with sealant are optionally exposed to high temperature.

According to various embodiments, the surface of one or more of the parts to which the sealant composition will be applied, e.g. the container and/or cover, may optionally be pre-treated before the sealing step, for example to eliminate mechanically distorted surface layers, to roughen the surface for improved bond strength, or to remove surface contaminants.

Once the sealing methods are complete and a hermetic seal is formed, the sealed container may be cleaned and/or optionally further processed in any way known to those of skill in the art, in order to render it suitable for the intended application. The hermetic seal may be visually inspected for imperfections (e.g., no visible cracks or separation).

Hermetically Sealed Containers

Also disclosed herein are containers that are hermetically sealed using the compositions and/or methods disclosed herein. The containers can include any shape and volume. By way of non-limiting example, a container can take the shape of a cylinder that is closed at one end and open at an opposite end. A cover or end cap can be sized to close the open end. The cover and container can include complementary grooves and protrusions, threads, and the like designed to facilitate the joining of the cover and container.

The container and/or cover can comprise a refractory ceramic or crystalline material, which may be the same or different for each component. According to one embodiment, the container and/or cover comprises $Al_2O_3$. In certain embodiments the cover and container are made from the same material.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

"At least one" as used herein means one or more and thus includes individual components as well as mixtures/combinations.

It is also to be understood that, as used herein the terms "the," "a," or "an," mean "at least one," and should not be limited to "only one" unless explicitly indicated to the contrary. Thus, for example, reference to "a part" includes examples having two or more such parts, unless the context clearly indicates otherwise.

Other than in the operating examples, or where otherwise indicated, all numbers expressing quantities of ingredients and/or reaction conditions are to be understood as being modified in all instances by the term "about" which can encompass ±10%, ±8%, ±6%, ±5%, ±4%, ±3%, ±2%, ±1%, or ±0.5%.

Ranges can be expressed herein as from "about" one particular value, and/or to "about" another particular value. When such a range is expressed, examples include the exact value(s) as alternate start and/or end points. Similarly, when values are expressed as approximations, by use of the antecedent "about," it will be understood that the particular value forms an additional embodiment. It will be further understood that the end points of each of the ranges are significant both in relation to the other endpoint, and independently of the other endpoint.

The terms "substantial," "substantially," and variations thereof as used herein are intended to note that a described feature is equal or approximately equal to a value or description.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method that comprises A+B+C include embodiments where a method consists of A+B+C and embodiments where a method consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The following Examples are intended to be non-restrictive and illustrative only, with the scope of the invention being defined by the claims.

EXAMPLES

Exemplary sealing processes were carried out using alumina ceramic components.

The following sealant compositions were prepared:

| Composition I | |
|---|---|
| Component | wt % |
| SiO$_2$ powder (Alfa Aesar 13024) | 37.9% |
| CaSiO$_3$ powder | 37.9% |
| Ethocel ™ 45 ethyl cellulose | 0.3% |
| butyl CARBITOL ™ | 15.2% |
| Vantex T ™ butyldiethanolamine | 8.8% |

| Composition II | |
|---|---|
| Component | wt % |
| SiO$_2$ powder (Huber Zeoflo TL) | 39.2% |
| MgTiO$_3$ powder | 4.1% |
| butyl CARBITOL ™ | 27.0% |
| Vantex T ™ butyldiethanolamine | 29.7% |

For each composition, the solvent, resin, and powder were blended. The sealant composition was applied to the container and cover, and the container was mated with a cover. The two components were held in place by gravity on a hotplate while the sealant composition was dried. After the sealant composition was dried, the sample was fired in a furnace.

Example 1

A long alumina tube of outside diameter 2.5 cm and about 58 cm length was sealed at one end with an approximately 3.5 cm diameter alumina disk using paste Composition I. The sample was dried then fired in a furnace at 1500° C. setpoint, in an ambient air atmosphere. After firing, the open end of the sample was attached to a vacuum pump with a dual o-ring seal, and the pump evacuated to about 3 e$^{-5}$ kPa. The closed end of the sample was heated to various temperatures and the leak-up rate measured at each temperature setting by temporarily closing a valve to the pump and recording the pressure rise vs. time using a MKS Baratron™ capacitance manometer. After a cumulative 1000 hours at a furnace setpoint of 1300° C., the leak-up rate measured while the sample was held at a setpoint of 1300° C. was less than 1×10$^{-5}$ kPa*cc/s, indicating a satisfactory hermetic seal.

Example 2

Another exemplary sealing process was carried out using parallel alumina plates joined to an alumina ring to form a container. 1.463 g of tungsten powder was placed on the bottom alumina plate inside the alumina ring. A second (top) alumina plate was placed on the alumina ring forming a container comprising the two alumina plates (bottom and top) and the alumina ring with the tungsten powder inside the container. Sealant Composition I was applied where the first alumina plate and the alumina ring contact, as well as where the second alumina plate and alumina ring contact, sealing the container with the tungsten powder inside. The sealed container was dried, and then fired in a vacuum at 1500° C. furnace setpoint to form the hermetic seal. The sealed container was then refired at 1200° C. and atmospheric conditions (e.g., exposed to oxygen).

| Cumulative firing time at 1200° C. | Cumulative Mass gain |
|---|---|
| 30 hours | 0.003 g |
| 80 hours | 0.006 g |

As shown above, the minimal gain in mass when exposed to external atmospheric conditions (e.g., containing oxygen) while heating to 1200° C. demonstrates that the tungsten powder inside was not subjected to substantial oxidation. Thus, the sealant composition formed a satisfactory hermetic seal.

Example 3

Another exemplary sealing process was carried out using parallel alumina plates joined to an alumina ring to form a container. 1.646 g of tungsten powder was placed on the bottom alumina plate inside the alumina ring. A second (top) alumina plate was placed on the alumina ring forming a container comprising the two alumina plates (bottom and top) and the alumina ring with the tungsten powder inside the container. Sealant Composition II was applied where the first alumina plate and the alumina ring contact, as well as where the second alumina plate and alumina ring contact, sealing the container with the tungsten powder inside. The sealed container was dried, and then fired at 1600° C. furnace setpoint in a nitrogen atmosphere. The sealed container was then refired at 1200° C. under atmospheric conditions (e.g., exposed to oxygen).

| Cumulative firing time at 1200° C. | Cumulative Mass gain |
|---|---|
| 10 hours | 0.001 g |
| 40 hours | 0.005 g |
| 112 hours | 0.016 g |
| 196 hours | 0.018 g |

As shown above, the minimal gain in mass when exposed to external atmospheric conditions (e.g., containing oxygen) while heating to 1200° C. demonstrates that the tungsten powder inside was not subjected to substantial oxidation. Thus, the sealant composition formed a satisfactory hermetic seal.

What is claimed is:

1. A sealant composition comprising:
    at least about 10 mole % of an inorganic oxide chosen from $MgSiO_3$, $MgTiO_3$, MgO, CaO, $CaSiO_3$, or any combination thereof;
    at least about 50 mole % of $SiO_2$;
    less than about 10 mole % of an inorganic oxide chosen from BaO, SrO, $TiO_2$, $ZrO_2$, ZnO, $Al_2O_3$, rare earth oxides, or any combination thereof;
    at least one solvent; and
    optionally at least one organic resin binder;
    wherein the coefficient of thermal expansion of the sealant composition is less than or equal to about $8\times10^{-6}/°$ C., and
    wherein the mole percentages are relative to a total molar amount of inorganic oxides included in the sealant composition.

2. The sealant composition of claim 1, wherein $SiO_2$ is present in an amount of at least about 55 mole %, relative to the total amount of inorganic oxide.

3. The sealant composition of claim 1, wherein $SiO_2$ is present in an amount of at least about 60 mole %, relative to the total amount of inorganic oxide.

4. The sealant composition of claim 1, wherein the $SiO_2$ is present in an amount ranging from about 75 to about 85 mole %, relative to the total amount of inorganic oxide.

5. The sealant composition of claim 1, wherein the at least one solvent is chosen from water, organic solvents, and mixtures thereof.

6. The sealant composition of claim 1, wherein the at least one solvent is present in an amount greater than or equal to about 30%, by volume, relative to the total volume of the sealant composition prior to firing.

7. The sealant composition of claim 1, wherein the at least one organic resin binder is chosen from cellulose derivatives, polyurethanes, acrylics, terpenes, and styrenes.

8. The sealant composition of claim 1, wherein coefficient of thermal expansion of the sealant composition is less than or equal to about $6\times10^{-6}/°$ C.

9. A method for forming a hermetic seal comprising:
    applying a sealant composition to at least one of a first component and a second component at an area where the first component and second component are to be joined;
    adjoining the first component and second component; and
    applying heat to the to the first component, second component, and sealant composition to increase the surrounding air temperature to at least about 1000° C.;
    wherein the sealant composition comprises:
        at least about 10 mole % of an inorganic oxide chosen from $MgSiO_3$, $MgTiO_3$, MgO, CaO, $CaSiO_3$, or any combination thereof;
        at least about 50 mole % of $SiO_2$;
        less than about 10 mole % of an inorganic oxide chosen from BaO, SrO, $TiO_2$, $ZrO_2$, ZnO, $Al_2O_3$, rare earth oxides, or any combination thereof;
        at least one solvent;
        optionally at least one organic resin binder;
    wherein the coefficient of thermal expansion of the sealant composition is less than or equal to about $8\times10^{-6}/°$ C.; and
    wherein the mole percentages are relative to a total molar amount of inorganic oxides included in the sealant composition.

10. The method of claim 9, further comprising reducing the pressure to less than 10 kPa.

11. The method of claim 9, wherein the sealant composition comprises $SiO_2$ in an amount of at least about 55 mole %, relative to the total amount of inorganic oxide.

12. The method of claim 9, wherein the sealant composition comprises $SiO_2$ in an amount of at least about 60 mole %, relative to the total amount of inorganic oxide.

13. The method of claim 9, wherein the sealant composition $SiO_2$ in an amount of about 75 to about 85 mole %, relative to the total amount of inorganic oxide.

14. The method of claim 9, wherein the sealant composition comprises at least one solvent chosen from water, organic solvents, and mixtures thereof.

15. The method of claim 9, wherein the sealant composition comprises at least one solvent in an amount greater than or equal to about 30%, by volume, relative to the total volume of the sealant composition.

16. The method of claim 9, wherein the sealant composition comprises at least one organic resin binder chosen from cellulose derivatives, polyurethanes, acrylics, terpenes, and styrenes.

17. A hermetically sealed container comprising:
    a body comprising at least one opening;
    a cover sized to close the at least one opening;
    a hermetic seal formed between the body and cover, formed from a sealant composition comprising:
        at least about 10 mole % of an inorganic oxide chosen from $MgSiO_3$, MgO, $MgTiO_3$, CaO, $CaSiO_3$, or any combination thereof;
        at least about 50 mole % of $SiO_2$;
        less than about 10 mole % of an inorganic oxide chosen from BaO, SrO, $TiO_2$, $ZrO_2$, ZnO, $Al_2O_3$, rare earth oxides, or any combination thereof;
        at least one solvent;
        optionally at least one organic resin binder;

wherein the coefficient of thermal expansion of the sealant composition is less than or equal to about $8\times10^{-6}/°$ C., and wherein the mole percentages are relative to a total molar amount of inorganic oxides included in the sealant composition.

\* \* \* \* \*